N. G. SWIFT.
Improvement in Machines for Sowing Pulverulent Manures.

No. 116,116. Patented June 20, 1871.

WITNESSES,

INVENTOR

UNITED STATES PATENT OFFICE.

N. G. SWIFT, OF HART'S VILLAGE, NEW YORK.

IMPROVEMENT IN MACHINES FOR SOWING PULVERULENT MANURES.

Specification forming part of Letters Patent No. 116,116, dated June 20, 1871.

*To all whom it may concern:*

Be it known that I, N. G. SWIFT, of Hart's Village, in the county of Dutchess and State of New York, have invented an Improved Machine for Sowing Pulverulent Manures; and I do hereby declare that the following is a full, clear, and exact description thereof, which will enable others skilled in the art to make and use the same, reference being had to the accompanying drawing forming part of this specification.

My invention relates to manure-sowers, and consists in an improved arrangement of parts, as hereinafter described and clearly pointed out in the claim.

Figure 1:
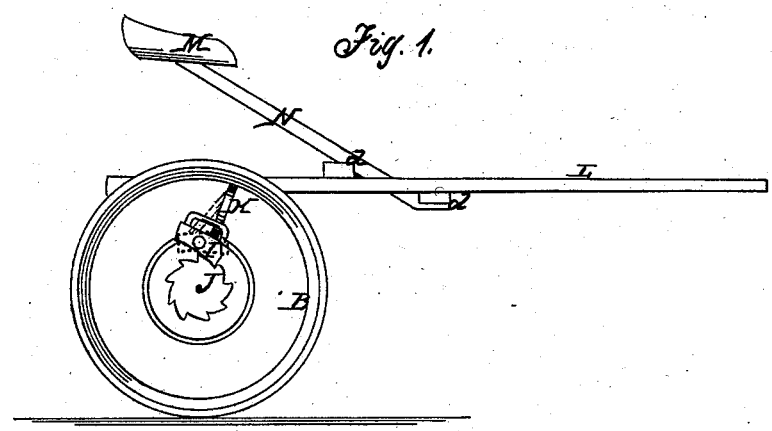
Figure 2:
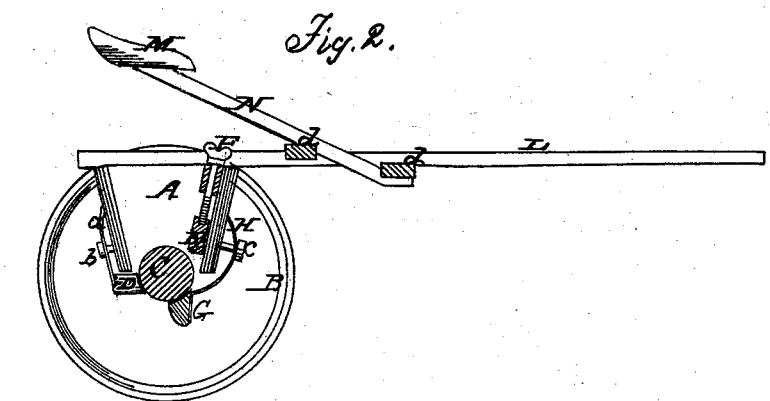
Figure 3:
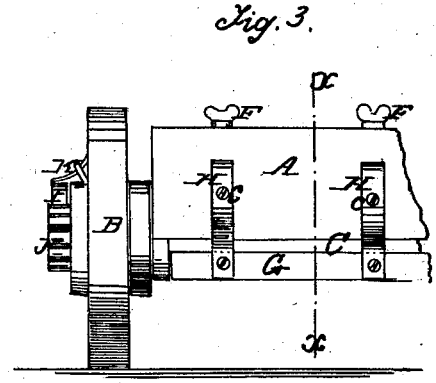

In the accompanying drawing, Figure 1 is a side view of my invention; Fig. 2, a vertical section of the same taken in the line $xx$, Fig. 3; Fig. 3, a front view of the same.

Similar letters of reference indicate corresponding parts.

A represents a box, in which the manure to be sowed is placed. This box is mounted on two wheels, B, the axles of which are driven into the ends of a roller, C, the latter forming the bottom of the box, and the escape of manure between the rear side of the roller and the back of the box being prevented by a pressure-bar, D, attached to springs $a$, the pressure of the springs being graduated by screws $b$, as will be fully understood by referring to Fig. 2. To the inner side of the front of the box A there is a gauge, E, which is simply a horizontal bar, arranged with set-screws F, so that it may be raised or lowered, as required, (see Fig. 2,) to admit of a greater or lesser discharge-space between the front part of the roller and the gauge. G is a clearer, composed of a bar attached to springs H, which are secured to the front of box A, the pressure of the clearer against the roller being regulated, as required, by set-screws $c$. (See Fig. 2.) Instead of one roller, C, I design, in practice, to leave two, placed in line with each other, with their inner bearings in a central transverse partition in box A. This will admit of the machine being readily turned and insure a more even distribution of the manure. In this case a gauge, E, will require to be in each compartment of box A, and the pressure-bars D behind the roller, and the clearer G in front of it. The wheels are placed loosely on their axles, and they are connected with the latter so as to turn the roller or rollers C, as the machine is drawn along, by means of pawls I and ratchets J, the pawls being attached to the wheels B, and the ratchets secured on the outer ends of the axles. The pawls are kept engaged with the ratchets by springs K, which are adjustable so that they may be made to bear either upon the front or rear parts of the pawls, the springs bearing upon the front parts of the pawls when it is desired to keep them engaged with the ratchets, and the roller or rollers C to turn with the wheels, as shown in black in Fig. 1, and bearing upon the rear parts when it is desired to have the front ends of the pawls free from the ratchets and the machine drawn along without turning the rollers. The thills L are attached to the top of the box A, and the driver's seat M secured to supports N, connected at their lower ends to the cross-pieces $d$ of the thills.

The manure, it will be seen, is discharged from the box A by the revolving of the roller or rollers C, and in greater or lesser quantity by adjusting the gauge or gauges E.

I am aware that the specific parts are not now for the first time brought before the public, and I therefore desire to disclaim them as my invention.

The present patent is intended to protect a new mode of arranging certain essential parts of the machine, which is believed to constitute a valuable improvement upon the patent granted to me July 9, 1861.

Having thus described all that is necessary to a full understanding of my invention, what I wish to protect by Letters Patent is—

The arrangement of box A, roller C, spring pressure-bar D $a$, gauge E, and spring-clearer G H, as and for the purpose specified.

N. G. SWIFT.

Witnesses:
FRANK BLOCKLEY,
ALEX. F. ROBERTS.